United States Patent
Beregi et al.

[15] 3,683,008
[45] Aug. 8, 1972

[54] PHENYL PROPYLAMINO ALKANOLS AND THEIR ESTERS

[72] Inventors: Laszlo Beregi, Boulogne Sur/Seine; Pierre Hugon, Rueil Malmaison; Jean-Claude Le Douarec, Suresnes; Jacques Duhault, Chatou, all of France

[73] Assignee: Societe en nom collectif "Science Union Et Cie, Societe Francaise De Recherchie Medical", Surenes, France

[22] Filed: Jan. 9, 1970

[21] Appl. No.: 1,878

[30] Foreign Application Priority Data

Jan. 29, 1969 France.....................6901528

[52] U.S. Cl............260/477, 260/472, 260/473 R, 260/473 G, 260/570.6, 424/308, 424/330, 260/340.5
[51] Int. Cl.........................C07c 91/06, C07c 93/00
[58] Field of Search............................260/477, 570.6

[56] References Cited

UNITED STATES PATENTS

| | | | |
|---|---|---|---|
| 3,504,028 | 3/1970 | Beregi | 260/570.8 R |
| 3,364,239 | 1/1968 | Sperangu | 260/570.8 R |
| 3,496,195 | 2/1970 | Ecsery et al | 260/570.8 R |
| 3,198,833 | 8/1965 | Beregi et al | 260/570.8 R |
| 2,421,129 | 5/1947 | Reasenberg et al | 260/477 |
| 2,901,507 | 8/1959 | Spieter et al | 260/477 |

Primary Examiner—Lorraine A. Weinberger
Assistant Examiner—R. S. Weissberg
Attorney—Gordon W. Hueschen

[57] ABSTRACT

Phenyl propylamino alkanols and their esters of the formula:

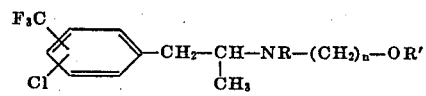

wherein
- R is hydrogen or lower alkyl,
- n is 2 or 3, and
- R' is hydrogen or COR" wherein R" is
  - phenyl, halophenyl, lower alkylphenyl, lower alkyloxy-phenyl, methylenedioxyphenyl, nitrophenyl, trifluoromethylphenyl, or
  - -arylalkyl, haloarylalkyl, lower alkylarylalkyl, lower alkyloxyarylalkyl, methylenedioxyarylalkyl, nitroarylalkyl, trifluoromethyl-arylalkyl, or
  - -aryloxyalkyl or haloaryloxyalkyl.

These compounds possess anorexigenic, analgesic, anticonvulsivant and lipid metabolism regulating properties.

3 Claims, No Drawings

PHENYL PROPYLAMINO ALKANOLS AND THEIR ESTERS

The present invention provides phenyl propylamino alkanols and their esters of the general formula (I):

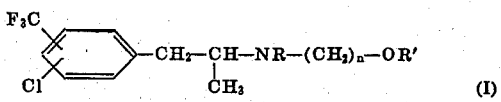

wherein:
- R is selected from the group consisting of a hydrogen atom and a lower alkyl radical containing up to five carbon atoms inclusive,
- $n$ is the integer 2 or 3, and
- R' is selected from the group consisting of:
  a. - a hydrogen atom, and
  b. - a COR" group, wherein R" is selected from the group consisting of:
1. - a phenyl radical ro a phenyl radical substituted by one or more substituents, chosen in the group formed of halogen atoms, lower alkyl or alkyloxy radicals containing up to four carbon atoms inclusive, methylenedioxy, nitro and trifluoromethyl radicals;
2. - an aralkyl radical, such, for example, as benzyl, phenethyl or cinnamyl, wherein the aryl group may be substituted by one or more substituents, chosen in the group formed of halogen atoms, lower alkyl or alkyloxy radicals containing up to 4 carbon atoms inclusive, methylene-dioxy, nitro and trifluoromethyl radicals;
3. - an aryloxy alkyl radical, such, for example, as phenoxy methyl, phenoxy ethyl, phenoxy propyl or 2-phenoxy-2-methyl propyl, wherein the aryl group may be substituted by one or more halogen atoms.

The compounds of the general formula (I) are new and may be prepared by reacting a phenylisopropylamine of the formula (II):

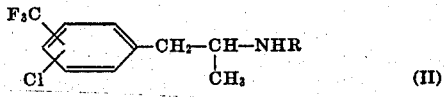

wherein R has the meaning given above, with ethylene oxide or trimethylene oxide, in order to obtain the compound in which R"=H.

The so-obtained alcohol is esterified with an acyl halide of the general formula (III):

$$R'' - CO - X \quad \text{III}$$

wherein X is a halogen atom and R" has the meanings defined above, in order to obtain the compounds in which R' = COR", R" having the meanings defined above.

The esterification may be carried out on dextrogyre, levogyre or racemic amino alcohol. The resolution may be conducted either on substituted phenylisopropylamine, in order to use the optical isomers as starting materials, or on the hydroxy alkyl compounds themselves.

The separation of the optical isomers may be effected by treating the racemic compounds with $d$ (-) dibenzoyl tartaric acid, in order to obtain the levogyre isomers and then with $d$ camphoric acid, in order to obtain the dextrogyre isomers.

The separation of the optical isomers is also included in the present invention.

The new compounds of the general formula (I) may be converted into addition salts with mineral or organic acids. As mineral acids, there may be mentioned hydrochloric, hydrobromic, sulfuric, phosphoric and sulfamic acids and, as organic acids : acetic, propionic, maleic, fumaric, tartaric, citric, oxalic, methane sulfonic, benzoic, anthranilic acids, etc. . . . These salts are also included in the present invention.

The new compounds of the present invention and their physiologically tolerable addition salts possess valuable pharmacological and therapeutic properties. They may be used, in particular, as anorexigenic, analgesic, anticonvulsivant and lipid metabolism regulator.

Their toxicity is weak and the $LD_{50}$ studied in mice varies from 110 to 390 mg/kg by the intraperitoneal route and from 650 to >2000 mg/kg by the oral route.

The anorexigenic activity was studied in the rat and in the dog. It was observed that the food intake of the animals was reduced by 50 percent 2 hours after administering the products at the dose of 3,2 to 20 mg/kg P.O.

The analgesic activity was demonstrated in mice by the Haffner method (DMW 55, 751, 1929). Administered by the intraperitoneal route, the active dose is in the range of 25 to 100 mg/kg for the different compounds of the invention.

The anticonvulsivant activity of the compounds was also demonstrated by the fact that 50 percent of the animals were protected from the convulsions induced by electroshock, with the dose of 20 to 50 mg/kg, administered by the oral route.

The activity of the compounds on lipid metabolism was evidenced by the determination of the free fatty acids in the plasma and by the decrease of the epididymal fat in the animals treated. It was found that some compounds of the invention, administered by the oral route at the dose of 50 mg/kg, induce in the rat an increase up to 95 percent of the non-esterified plasmatic fatty acids. After 10 days of administering to the rat 30 to 50 mg/kg P.O. of the new compounds a considerable decrease — up to 55 percent — of the epididymal fat may be observed in comparison with the untreated animals.

The hereabove described properties, as well as the low toxicity, allow the use of the new compounds in human therapy, especially in the treatment of obesity, pain and epilepsy.

They can be administered in different pharmaceutical forms, such as tablets, dragees, granules, capsules, suppositories, drinkable or injectable solutions, in admixture or conjection with a suitable, solid or liquid pharmaceutical carrier, such, for example, as distilled water, lactose, talc, gum-arabic, magnesium stearate, ethyl cellulose.

The doses used may vary within the range of from 10 to 200 mg by the oral, rectal or parenteral route.

The following examples illustrate the invention.

All parts are given by weight, unless otherwise specified, and melting points are determined by the Kofler method.

EXAMPLE 1

1-(3-trifluoromethyl-4-chloro-phenyl)-2-[(β-hydroxy-ethyl) amino] propane

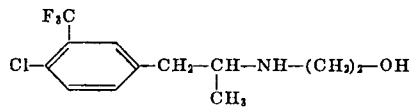

To 20 parts of 1-(3-trifluoromethyl-4-chloro-phenyl)-2-amino propane is added a solution of 3 parts of ethylene oxide in 40 parts of ethanol at 95 percent. The mixture is heated, in a pressure bottle, to 90°–100° C for 2 hours. After cooling, the solvent is evaporated and the residue distilled under vacuum. 10.2 parts of 1-(3-trifluoromethyl-4-chloro-phenyl)-2-[(β-hydroxy-ethyl) amino] propane are obtained, B.P. (under 0.6 mm of Hg) 132°–134° C, M.P. 60°–62° C, the acid fumarate melting at 132° C (isopropanol).

EXAMPLE 2

1-(3-trifluoromethyl-4-chloro-phenyl)-2-[(β-benzoyloxy-ethyl) amino] propane

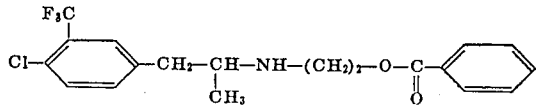

To a solution of 4 parts of 1-(3-trifluoromethyl-4-chloro-phenyl)-2-[(β-hydroxy-ethyl) amino] propane in 30 parts of ethanol, the theoretical quantity of hydrochloric ether is added, then the solution is evaporated to dryness under vacuum. 12 parts of benzoyl chloride are added to the residue and the so-obtained solution is heated to 95°–100° C under nitrogen flow, until the theoretical quantity of HCl is freed, this taking about 20 minutes. After cooling, the reaction mixture is poured into 100 parts of ether. The precipitate formed is suctioned off and air-dried. 5 parts of 1-(3-trifluoro-methyl-4-chloro-phenyl)-2-[(β-benzoyloxy-ethyl) amino] propane hydrochloride, melting at 159°–160° C (ethyl acetate), are obtained.

EXAMPLES 3 – 11

By proceeding in the same way, the following compounds were prepared:

3. 1-(3-trifluoromethyl-4-chloro-phenyl)-2-[(β-phenylacetoxy-ethyl) amino] propane hydrochloride,
starting from 1-(3-trifluoromethyl-4-chloro-phenyl)-2-[(β-hydroxy-ethyl) amino] propane and phenyl acetyl chloride.

4. 1-(3-trifluoromethyl-4-chloro-phenyl)-2-[(β-p-chlorophenoxyacetoxy-ethyl) amino] propane hydrochloride,
starting from 1-(3-trifluoromethyl-4-chloro-phenyl)-2-[(β-hydroxy-ethyl) amino] propane and p-chlorophenoxy acetyl chloride.

5. 1-(3-trifluoromethyl-4-chloro-phenyl)-2-[β-(2-p-chlorophenoxy-2-methyl-propionyloxy) ethyl amino] propane hydrochloride,
starting from 1-(3-trifluoromethyl-4-chloro-phenyl)-2-[(β-hydroxy-ethyl) amino] propane and 2-p-chlorophenoxy-2-methyl propionyl chloride.

6. Trans 1-(3-trifluoromethyl-4-chloro-phenyl)-2[(β-cinnamyloxy-ethyl) amino] propane hydrochloride,
starting from 1-(3-trifluoromethyl-4-chloro-phenyl)-2-](β-hydroxy-ethyl) amino] propane and trans cinnamoyl chloride.

7. 1-(3-trifluoromethyl-4-chloro-phenyl)-2-[(β-m-trifluoromethyl-benzoyloxy-ethyl) amino] propane hydrochloride,
starting from 1-(3-trifluoromethyl-4-chloro-phenyl)-2-[(β-hydroxy-ethyl) amino] propane and m-trifluoromethylbenzoyl chloride.

8. 1-(3-trifluoromethyl-4-chloro-phenyl)-2-[(β-p-chlorobenzoyloxy-ethyl) amino] propane hydrochloride,
starting from 1-(3-trifluoromethyl-4-chloro-phenyl)-2-[(β-hydroxy-ethyl) amino] propane and p-chlorobenzoyl chloride.

9. 1-(3-chloro-4-trifluoromethyl-phenyl)-2-[(β-benzoyloxy-ethyl) amino] propane hydrochloride,
starting from 1-(3-chloro-4-trifluoromethyl-phenyl)-2-[(β-hydroxy-ethyl) amino] propane and benzoyl chloride.

10. 1-(3-trifluoromethyl-4-chloro-phenyl)-2-[(β-hydroxy-ethyl-N-methyl) amino] propane hydrochloride,
starting from 1-(3-trifluoromethyl-4-chloro-phenyl)-2-(N-methyl amino) propane and ethylene oxide.

11. 1-(3-trifluoromethyl-4-chloro-phenyl-2-[(γ-hydroxy-propyl) amino] propane hydrochloride,
starting from 1-(3-trifluoromethyl-4-chloro-phenyl)-2-amino propane and trimethylene oxide.

We claim:

1. A compound selected from the group consisting of

A. - phenyl propylamino alkanols and their esters of the general formula (I):

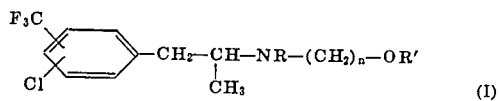

wherein
- R is selected from the group consisting of hydrogen and lower alkyl having from one to five atoms inclusive,
- n is the integer 2 or 3, and
- R' is selected from the group consisting of hydrogen and COR'' wherein R'' is selected from the group consisting of:
- phenyl, halophenyl, trifluoromethylphenyl in form of racemic derivatives and optical isomers; and B. - physiologically acceptable addition salts with mineral or organic acids.

2. A compound of claim 1 which is 1-(3-trifluoromethyl-4-chloro-phenyl)-2-[(β-hydroxy-ethyl) amino] propane.

3. A compound of claim 1 which is 1-(3-trifluoromethyl-4-chloro-phenyl)-2-[(β-benzoyloxy-ethyl) amino] propane.

* * * * *